(12) United States Patent
Hsu et al.

(10) Patent No.: US 7,806,545 B2
(45) Date of Patent: Oct. 5, 2010

(54) OPTICAL PLATE HAVING THREE LAYERS AND BACKLIGHT MODULE WITH SAME

(75) Inventors: Tung-Ming Hsu, Tu-cheng (TW); Shao-Han Chang, Tu-cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 118 days.

(21) Appl. No.: 11/716,143

(22) Filed: Mar. 9, 2007

(65) Prior Publication Data
US 2008/0130117 A1    Jun. 5, 2008

(30) Foreign Application Priority Data
Dec. 1, 2006   (CN) .................... 2006 1 0201179

(51) Int. Cl.
F21V 17/02 (2006.01)
G09F 13/04 (2006.01)

(52) U.S. Cl. .................. 362/97.2; 362/330; 362/616; 362/620; 362/621; 349/64

(58) Field of Classification Search ......... 362/606–607, 362/29–30, 330–332, 339, 618, 627, 629, 362/97.1–97.2, 616, 620–621; 359/707; 349/64
See application file for complete search history.

(56) References Cited

U.S. PATENT DOCUMENTS

| 6,104,854 A | 8/2000 | Masaki et al. |
| 6,870,674 B2 | 3/2005 | Ookawa et al. |
| 2006/0146566 A1* | 7/2006 | Ko et al. .................... 362/611 |
| 2007/0014034 A1* | 1/2007 | Lee et al. .................... 359/707 |
| 2007/0285785 A1* | 12/2007 | Lin ............................ 359/599 |

FOREIGN PATENT DOCUMENTS

| CN | 100458471 C | 2/2009 |
| TW | M273010 | 8/2005 |
| TW | M277950 | 10/2005 |
| TW | I252344 | 4/2006 |
| WO | WO2006026743 A1 | 3/2006 |
| WO | WO2006/109818 A1 | 10/2006 |

* cited by examiner

*Primary Examiner*—Jason Moon Han
*Assistant Examiner*—Sean P Gramling
(74) *Attorney, Agent, or Firm*—Jeffrey T. Knapp

(57) ABSTRACT

An exemplary optical plate includes a first transparent layer, a second transparent layer and a light diffusion layer. The light diffusion layer is between the first and second transparent layers. The light diffusion layer, the first and second transparent layers are integrally formed. The light diffusion layer includes a transparent matrix resin and a plurality of diffusion particles dispersed in the transparent matrix resin. The first transparent layer includes a plurality of elongated V-shaped protrusions at an outer surface thereof that is distalmost from the second transparent layer. The second transparent layer includes a plurality of micro-recesses at an outer surface thereof that is distalmost from the first transparent layer. Each micro-recess is a frustum of an inverted pyramid in shape. A direct type backlight module using the optical plate is also provided.

15 Claims, 10 Drawing Sheets

60

OPTICAL PLATE HAVING THREE LAYERS AND BACKLIGHT MODULE WITH SAME

CROSS-REFERENCE TO RELATED APPLICATIONS

This application is related to nine copending U.S. patent applications, which are: application Ser. No. 11/620,951 filed on Jan. 8, 2007, and entitled "OPTICAL PLATE HAVING THREE LAYERS"; application Ser. No. 11/620,958, filed on Jan. 8, 2007, and entitled "OPTICAL PLATE HAVING THREE LAYERS AND MICRO PROTRUSIONS"; application Ser. No. 11/623,302, filed on Jan. 5, 2007, and entitled "OPTICAL PLATE HAVING THREE LAYERS"; application Ser. No. 11/623,303, filed on Jan. 15, 2007, and entitled "OPTICAL PLATE HAVING THREE LAYERS AND BACKLIGHT MODULE WITH SAME"; application Ser. No. 11/627,579, filed on Jan. 26, 2007, and entitled "OPTICAL PLATE HAVING THREE LAYERS"; application Ser. No. 11/716,140, and entitled "OPTICAL PLATE HAVING THREE LAYERS AND BACKLIGHT MODULE WITH SAME"; application Ser. No. 11/716,158, and entitled "OPTICAL PLATE HAVING THREE LAYERS AND BACKLIGHT MODULE WITH SAME"; application Ser. No. 11/716,323, and entitled "OPTICAL PLATE HAVING THREE LAYERS AND BACKLIGHT MODULE WITH SAME"; application Ser. No. 11/716,141, and entitled "OPTICAL PLATE HAVING THREE LAYERS AND BACKLIGHT MODULE WITH SAME". In all these copending applications, the inventor is Tung-Ming Hsu et al. All of the copending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

The lightness and slimness of LCD panels make them suitable for use in a wide variety of electronic devices such as personal digital assistants (PDAs), mobile phones, portable personal computers, and other electronic appliances. Liquid crystal is a substance that does not itself emit light. Rather, the liquid crystal relies on receiving light from a light source in order to display data and images. In the case of a typical LCD panel, a backlight module powered by electricity supplies the needed light.

FIG. 10 is a side cross-sectional view of a typical direct type backlight module 10 employing a typical optical diffusion plate. The backlight module 10 includes a housing 11, a plurality of lamps 12 disposed on a base of the housing 11, and a light diffusion plate 13 and a prism sheet 15 stacked on top of the housing 11 in that order. Inside walls of the housing 11 are configured for reflecting light toward the light diffusion plate 13. The light diffusion plate 13 includes a plurality of diffusion particles therein. The diffusion particles are configured for scattering the light, and thereby enhancing the uniformity of light output from the light diffusion plate 13. By scattering the light, the light diffusion plate 13 can correct what might otherwise be a narrow viewing angle experienced by a user of a corresponding LCD panel. The prism sheet 15 includes a plurality of V-shaped structures at a top thereof.

In use, light projecting from the lamps 12 enters the prism sheet 15 after being scattered by the light diffusion plate 13. The light is refracted and concentrated by the V-shaped structures of the prism sheet 15 so as to increase brightness of light illumination, and the light finally propagates into an LCD panel (not shown) disposed above the prism sheet 15. Although the brightness may be improved by the V-shaped structures, the viewing angle may be narrowed. In addition, even though the light diffusion plate 13 and the prism sheet 15 abut each other, a plurality of air pockets still exists at the boundary between them. When the backlight module 10 is in use, light passes through the air pockets, and some of the light undergoes total reflection at the air pockets. As a result, a light energy utilization ratio of the backlight module 10 is reduced.

Therefore, a new optical means is desired in order to overcome the above-described shortcomings.

SUMMARY

An optical plate includes a first transparent layer, a second transparent layer and a light diffusion layer. The light diffusion layer is between the first and second transparent layers. The light diffusion layer, the first and second transparent layers are integrally formed. The light diffusion layer includes a transparent matrix resin and a plurality of diffusion particles dispersed in the transparent matrix resin. The first transparent layer includes a plurality of elongated V-shaped protrusions at an outer surface thereof that is distalmost from the second transparent layer. The second transparent layer includes a plurality of micro-recesses at an outer surface thereof that is distalmost from the first transparent layer. Each micro-recess is defined by at least three inner sidewalls interconnecting with each other. A horizontal width of each sidewall of the micro-recess increases along a direction from an inmost end of the micro-recess to an opening of the micro-recess.

Other novel features and advantages will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present optical plate and backlight module, in detail.

Figure 1:
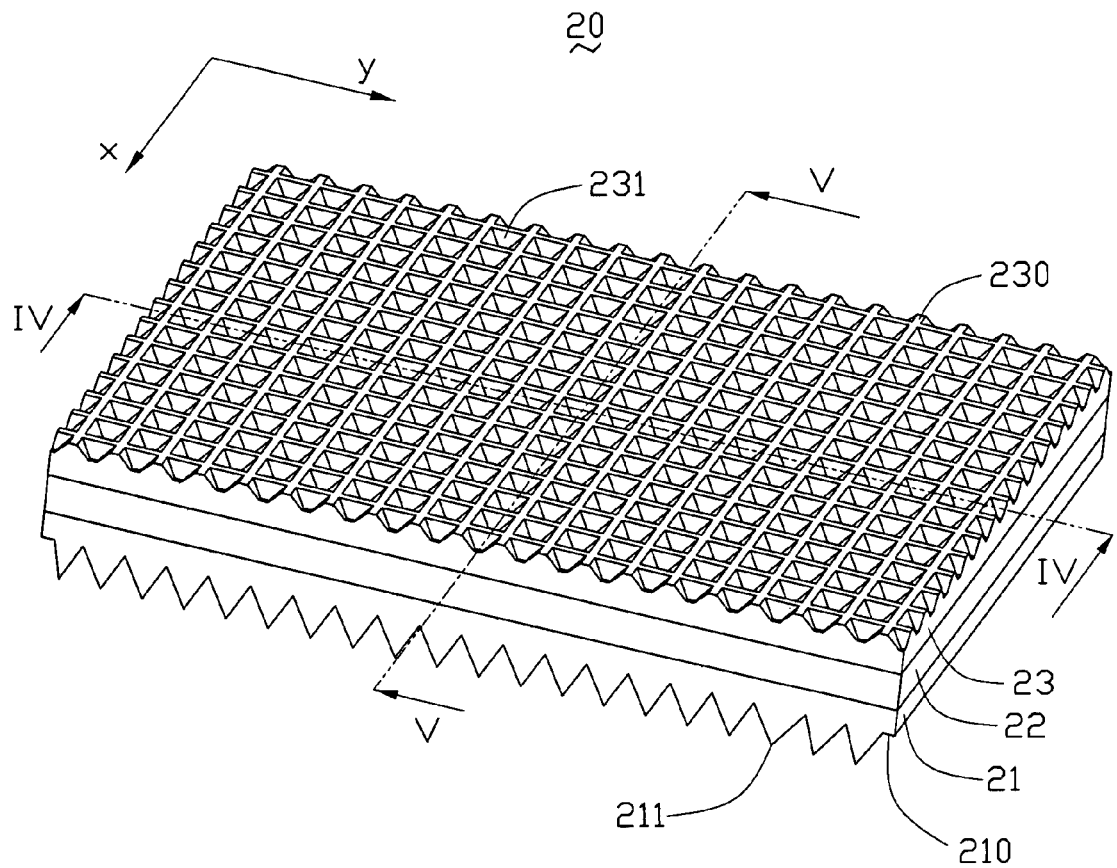
FIG. 1 is an isometric view of an optical plate in accordance with a first embodiment of the present invention.
Figure 2:
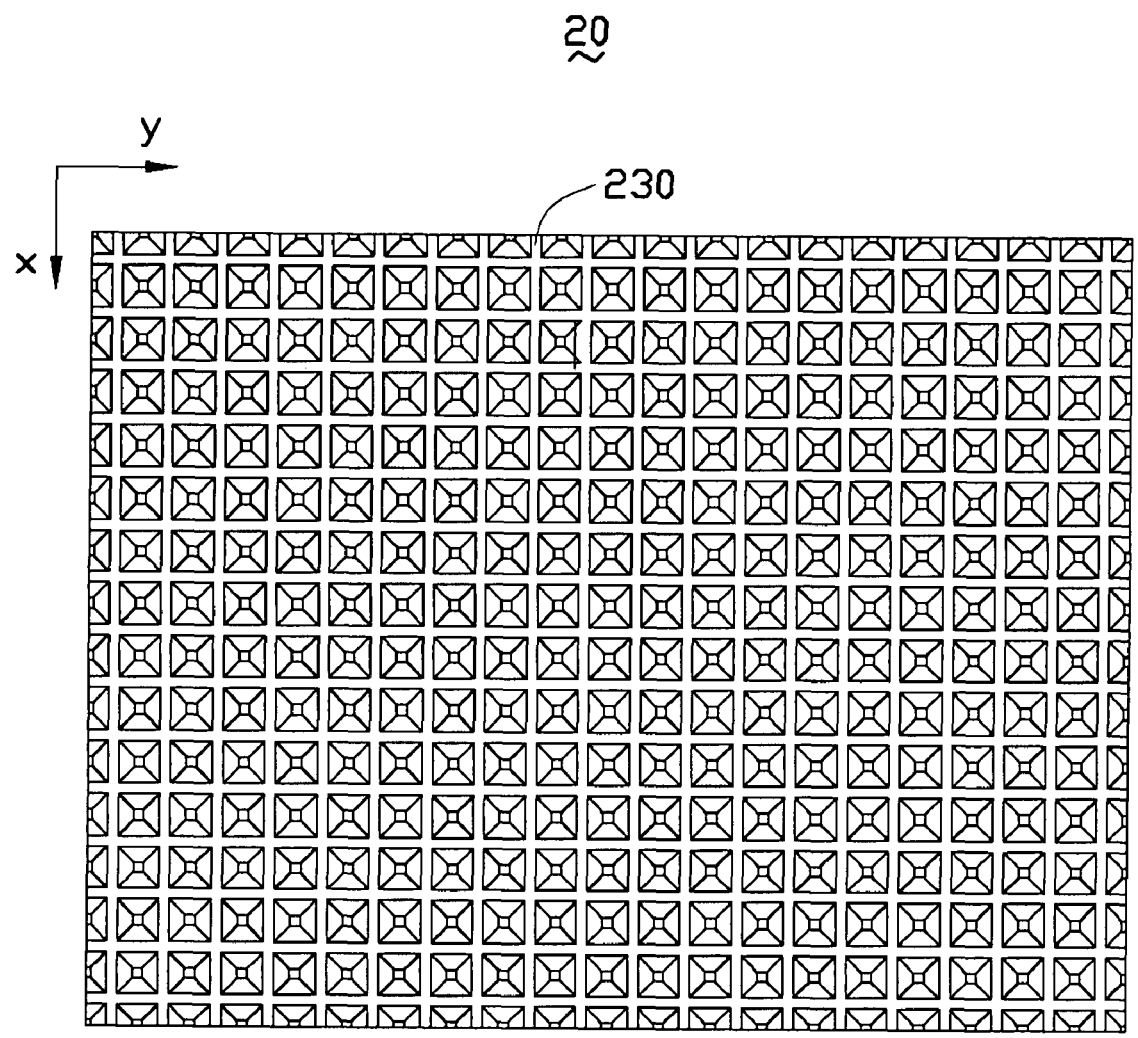
FIG. 2 is a top plan view of the optical plate of FIG. 1.
Figure 3:
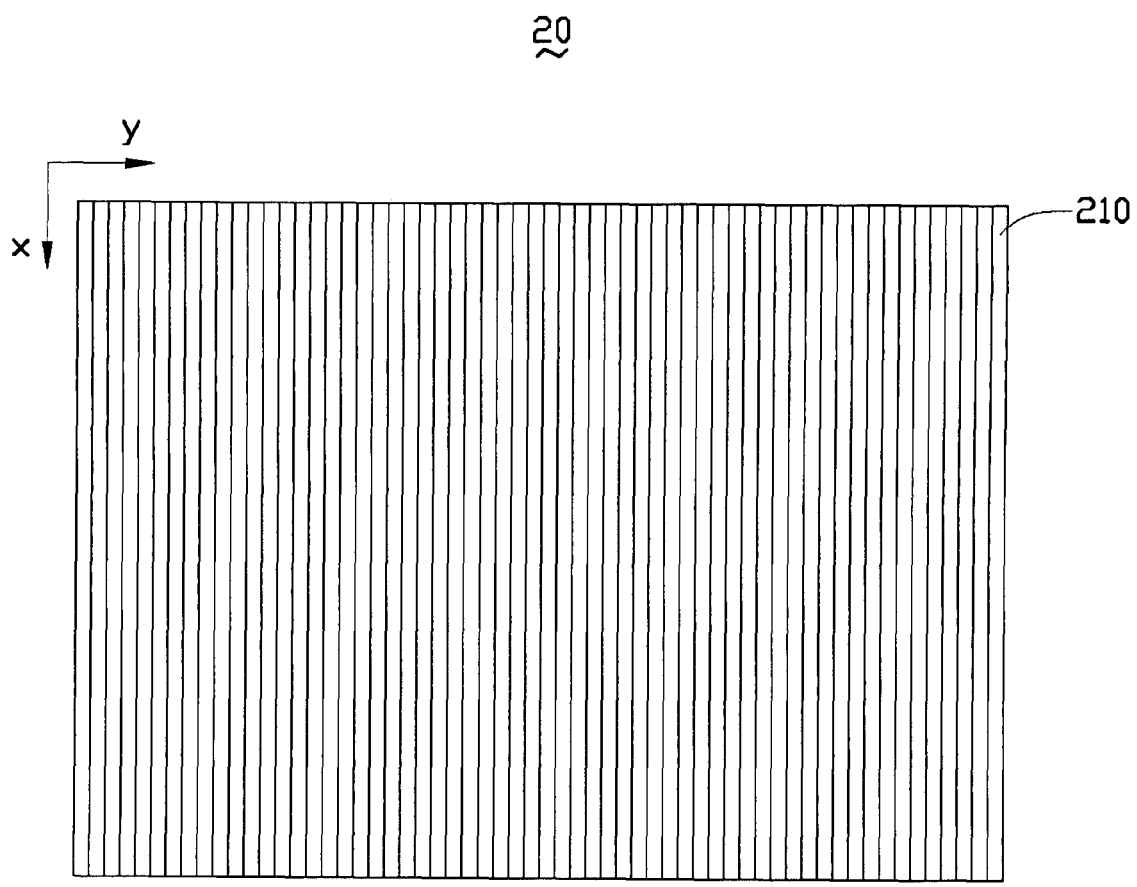
FIG. 3 is a bottom plan view of the optical plate of FIG. 1.

Referring to FIG. 1, an optical plate 20 according to a first embodiment of the present invention is shown. The optical plate 20 includes a first transparent layer 21, a light diffusion layer 22, and a second transparent layer 23. The first transparent layer 21, the light diffusion layer 22, and the second transparent layer 23 are integrally formed, with the light diffusion layer 22 between the first and second transparent layers 21, 23. The first transparent layer 21 and the light diffusion layer 22 are in immediate contact with each other at a first common interface thereof. Similarly, the second transparent layer 23 and the light diffusion layer 22 are in immediate contact with each other at a second common interface thereof. Multi-shot injection molding technology can be used to produce a unified body that is the optical plate 20, with no gaps existing at the first common interface or the second common interface. The first transparent layer 21 defines a plurality of elongated V-shaped protrusions 211 at an outer surface 210 that is distalmost from the second transparent layer 23. The second transparent layer 23 defines a plurality of micro-recesses 231 arranged in a matrix at an outer surface 230 that is distalmost from the first transparent layer 21.

Figure 4:
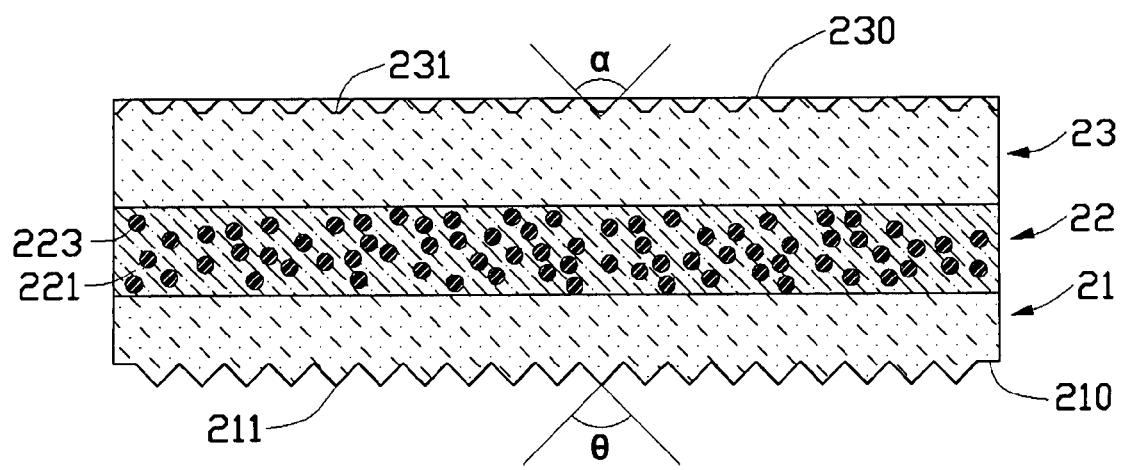
FIG. 4 is a side cross-sectional view of the optical plate of FIG. 1, taken along line IV-IV thereof.

Further referring to FIGS. 2 to 5, each of the plurality of elongated V-shaped protrusions 211 is an elongated prism (or ridge) that extends along a direction parallel to a side surface of the optical plate 20. The elongated V-shaped protrusions 211 are aligned side by side at the outer surface 210 of the first transparent layer 21, and are parallel to each other. A pitch between adjacent elongated V-shaped protrusions 211 is in a range from about 0.025 millimeters to about 1 millimeter. A vertex angle θ (as indicated in FIG. 4) of each elongated V-shaped protrusion 211 is preferably in a range from about 60 degrees to about 120 degrees. In alternative embodiments, each of the elongated V-shaped protrusions 211 can be oriented at a same oblique angle relative to the side surface of the optical plate 20. In other alternative embodiments, adjacent elongated V-shaped protrusions 211 can be spaced apart from each other by a predetermined interval.

Figure 5:
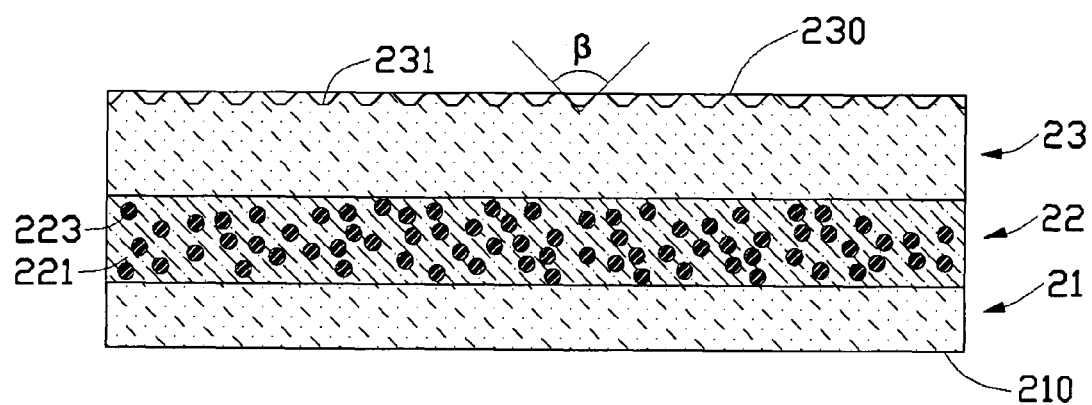
FIG. 5 is a side cross-sectional view of the optical plate of FIG. 1, taken along line V-V thereof.

In the illustrated embodiment, each of the micro-recesses 231 is defined by four inner sidewalls and a bottom wall. The four inner sidewalls are all isosceles trapezium-shaped, whereby a horizontal width of each sidewall increases along a direction from the bottom wall to a top opening of the micro-recess 231. Thereby, the four inner sidewalls and the bottom wall cooperatively define a frustum of an inverted rectangular pyramid. In the illustrated embodiment, the four inner sidewalls and the bottom wall cooperatively define a frustum of an inverted square pyramid. A first dihedral angle α (as shown in FIG. 4) defined by two opposing sidewalls of the micro-recess 231 is equal to a second dihedral angle β (as shown in FIG. 5) defined by another two opposing sidewalls of the micro-recess 231. The angle α and the angle β are each preferably in a range from 60 degrees to 120 degrees. A pitch between adjacent micro-recesses 231 along the X-direction is equal to that along the Y-direction. Preferably, the pitch is in a range from about 0.025 millimeters to about 1 millimeter. It should be understood that in alternative embodiments, any one or more of the four inner sidewalls can be quadrilateral-shaped, and/or any two or more of the four inner sidewalls can be different from each other in size and/or shape. In other alternative embodiments, each micro-recess 231 can be shaped as a frustum of an inverted triangular pyramid.

A thickness of each of the first transparent layer 21, the light diffusion layer 22, and the second transparent layer 23 may be greater than or equal to 0.35 millimeters. In a preferred embodiment, a combined thickness of the first transparent layer 21, the light diffusion layer 22, and the second transparent layer 23 is in a range from about 1.05 millimeters to about 6 millimeters. The first transparent layer 21 and the second transparent layer 23 can each be made of transparent matrix resin selected from the group consisting of polyacrylic acid (PAA), polycarbonate (PC), polystyrene (PS), polymethyl methacrylate (PMMA), methylmethacrylate and styrene (MS), and any suitable combination thereof. It should be pointed out that the materials of the first and second transparent layers 21, 23 can either be the same or different.

The light diffusion layer 22 comprises a plurality of diffusion particles 223 uniformly dispersed in a transparent matrix resin 221. The light diffusion layer 22 is configured for enhancing uniformity of light output from the optical plate 20. The transparent layer 221 is made of transparent matrix resin selected from the group consisting of polyacrylic acid (PAA), polycarbonate (PC), polystyrene (PS), polymethyl methacrylate (PMMA), methylmethacrylate and styrene (MS), and any suitable combination thereof. The diffusion particles 223 can be made of material selected from the group consisting of titanium dioxide, silicon dioxide, acrylic resin, and any combination thereof. The diffusion particles 223 are configured for scattering light and enhancing the light distribution capability of the light diffusion layer 22. The light diffusion layer 22 preferably has a light transmission ratio in a range from 30% to 98%. The light transmission ratio of the light diffusion layer 22 is determined by a composition of the transparent matrix resin 221 and the diffusion particles 223.

In the optical plate 20, the first common interface between the light diffusion layer 22 and the first transparent layer 21 is flat. In one kind of alternative embodiment, the first common interface between the light diffusion layer 22 and the first transparent layer 21 may be nonplanar. Similarly, the second common interface between the light diffusion layer 22 and the second transparent layer 23 can be flat or nonplanar.

Figure 6:
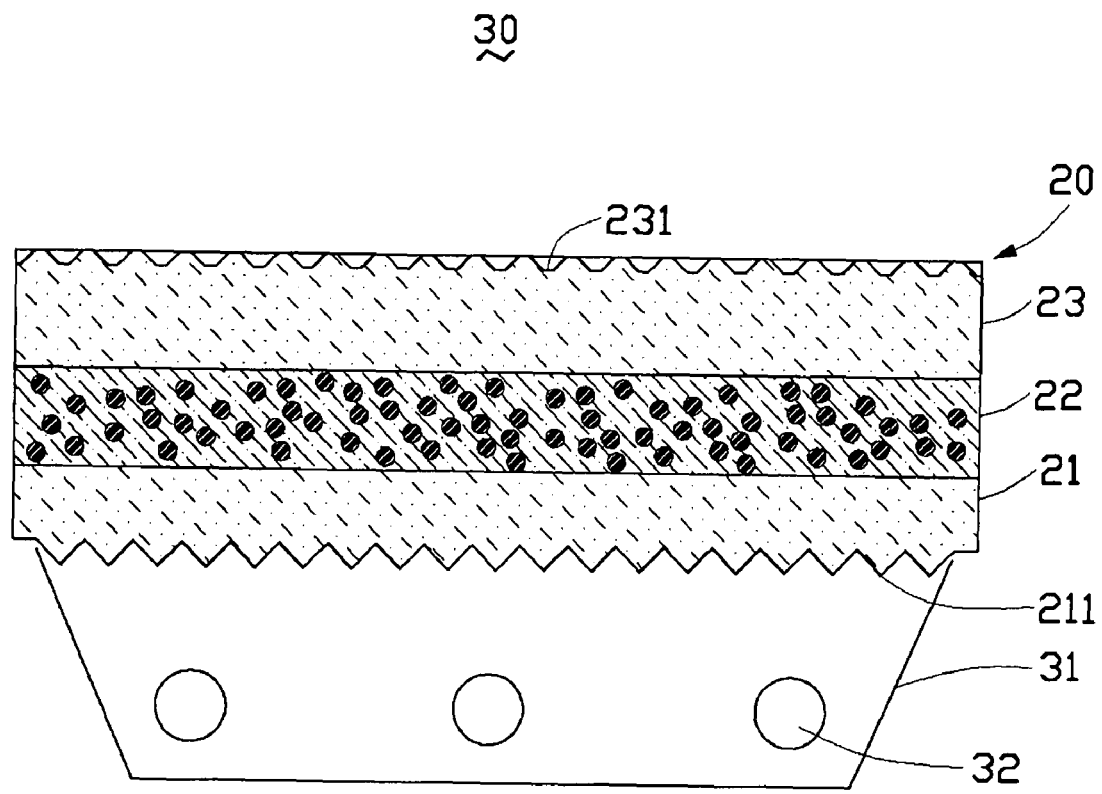
FIG. 6 is a side cross-sectional view of a direct type backlight module in accordance with a second embodiment of the present invention, the backlight module including the optical plate shown in FIG. 4.

Referring to FIG. 6, a direct type backlight module 30 according to a second embodiment of the present invention is shown. The backlight module 30 includes a housing 31, a plurality of lamp tubes 32, and the optical plate 20. The lamp tubes 32 are regularly arranged above a base of the housing 31. The optical plate 20 is positioned on top of the housing 31, with the first transparent layer 21 facing the lamp tubes 32. It should be pointed out that in an alternative embodiment, the second transparent layer 23 of the optical plate 20 can be arranged to face the lamp tubes 32. That is, light projecting from the lamp tubes 32 can enter the optical plate 20 via a selected one of the first transparent layer 21 and the second transparent layer 23.

In the backlight module 30, when the light enters the optical plate 20 via the first transparent layer 21, the light is first diffused by the elongated V-shaped protrusions 211 of the first transparent layer 21. The diffused light is then further substantially diffused by the light diffusion layer 22. Finally, the diffused light is concentrated by the micro-recesses 231 of the second transparent layer 23 before exiting the optical plate 20. Therefore, a brightness of the backlight module 30 is increased. In addition, the light is diffused at two levels, so that a uniformity of light output by the optical plate 20 is enhanced. Furthermore, the first transparent layer 21, the light diffusion layer 22, and the second transparent layer 23 are integrally formed together (see above), with no air or gas pockets trapped at the respective common interfaces therebetween. Thus little or no back reflection occurs at the common interfaces, and an efficiency of utilization of light is increased. Moreover, when the optical plate 20 is utilized in the backlight module 30, the optical plate 20 in effect replaces the conventional combination of a diffusion plate and a prism sheet. Thereby, a process of assembly of the backlight module 30 is simplified, and an efficiency of assembly is improved. Still further, in general, a volume occupied by the optical plate 20 is less than that occupied by the conventional combination of a diffusion plate and a prism sheet. Thereby, a volume of the backlight module 30 is reduced.

In the alternative embodiment, when the light enters the optical plate 20 via the second transparent layer 23, the uniformity of light output by the optical plate 20 is also enhanced, and the utilization efficiency of light is also increased. Nevertheless, the optical effects of the light emitted from the optical plate 20 via the first transparent layer 21 are different from those of the light emitted from the optical plate 20 via the second transparent layer 23. For example, when the light enters the optical plate 20 via the first transparent layer 21, a viewing angle of the backlight module 30 is somewhat greater than that of the backlight module 30 when the light enters the optical plate 20 via the second transparent layer 23.

Figure 7:
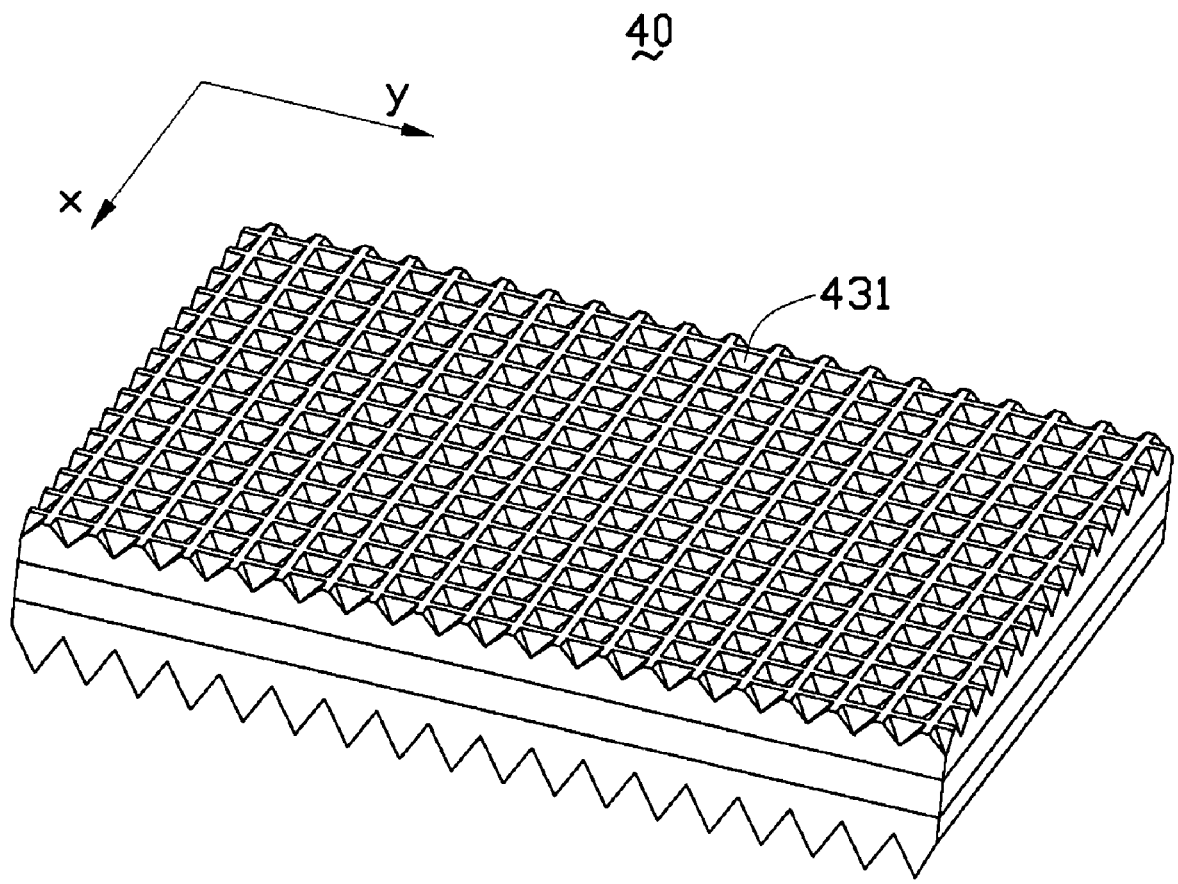
FIG. 7 is an isometric view of an optical plate in accordance with a third embodiment of the present invention.

Referring to FIG. 7, an optical plate 40 according to a third embodiment of the present invention is shown. The optical plate 40 is similar in principle to the optical plate 20 of the first embodiment, except that each sidewall of each of micro-recesses 431 is triangular. That is, each micro-recess 431 is an inverted rectangular pyramid in shape. A first dihedral angle defined by two opposing sidewalls of the micro-recess 431 is in a range from 60 degrees to 120 degrees. A second dihedral angle defined by another two opposing sidewalls of the micro-recess 431 is also in a range from 60 degrees to 120 degrees. It should be understood that in alternative embodiments, each micro-recess 431 can instead be defined by only three inner sidewalls. That is, each micro-recess can be shaped as an inverted triangular pyramid.

Figure 8:
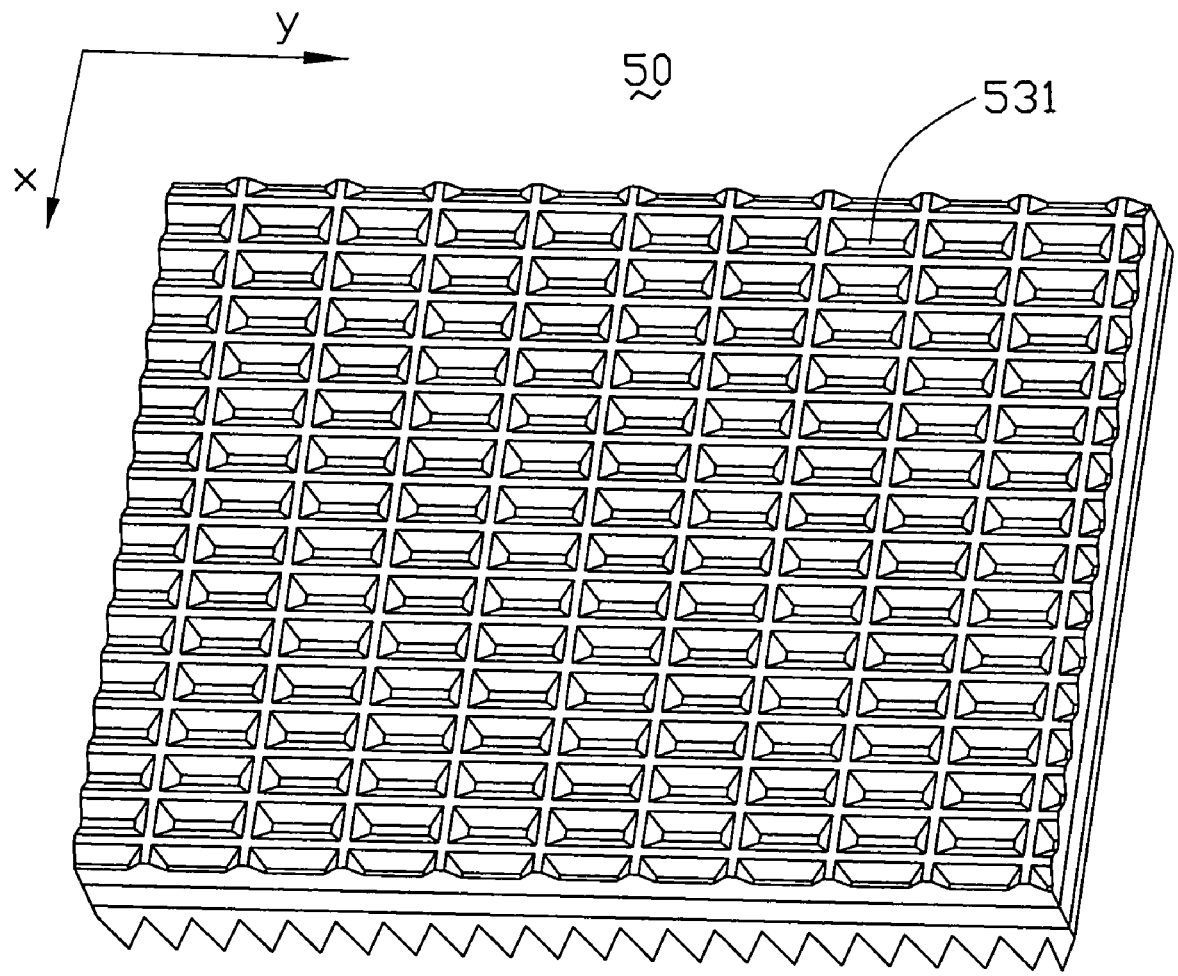
FIG. 8 is an isometric view of an optical plate in accordance with a fourth embodiment of the present invention.

Referring to FIG. 8, an optical plate 50 according to a fourth embodiment of the present invention is shown. The optical plate 50 is similar in principle to the optical plate 20 of the first embodiment. However, in the optical plate 50, four inner sidewalls and a bottom wall of each of micro-recesses 531 cooperatively define a frustum of an inverted rectangular (non-square) pyramid. In the illustrated embodiment, each micro-recess 531 is substantially oblong. More particularly, an area of each of two opposing long inner sidewalls of each micro-recess 531 is substantially larger than that of each of the other two opposing short inner sidewalls of the micro-recess 531. For example, as illustrated, the area of each long inner sidewall can be at least twice the area of each short inner sidewall. It should be understood that in alternative embodiments, the short sidewalls of each micro-recess 531 can be triangular. It should be understood that in other alternative embodiments, each micro-recess 531 can be defined by five or more inner sidewalls. That is, each micro-recess 531 can be shaped as an inverted polygonal pyramid or a frustum of an inverted polygonal pyramid.

Figure 9:
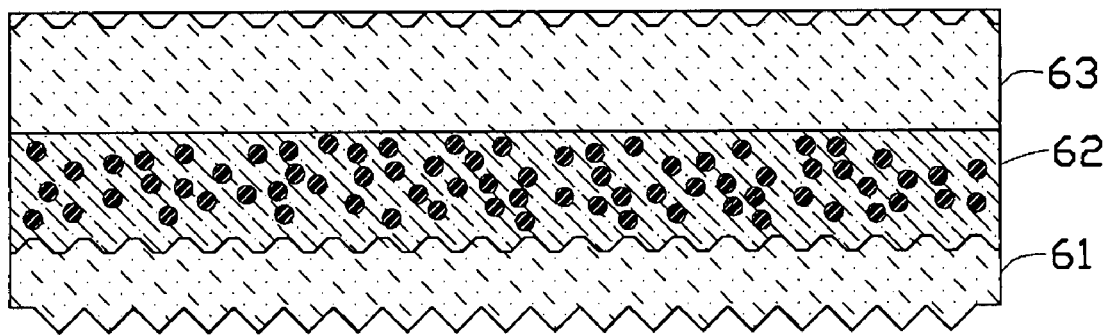
FIG. 9 is a side cross-sectional view of an optical plate in accordance with a fifth embodiment of the present invention.
Figure 10:
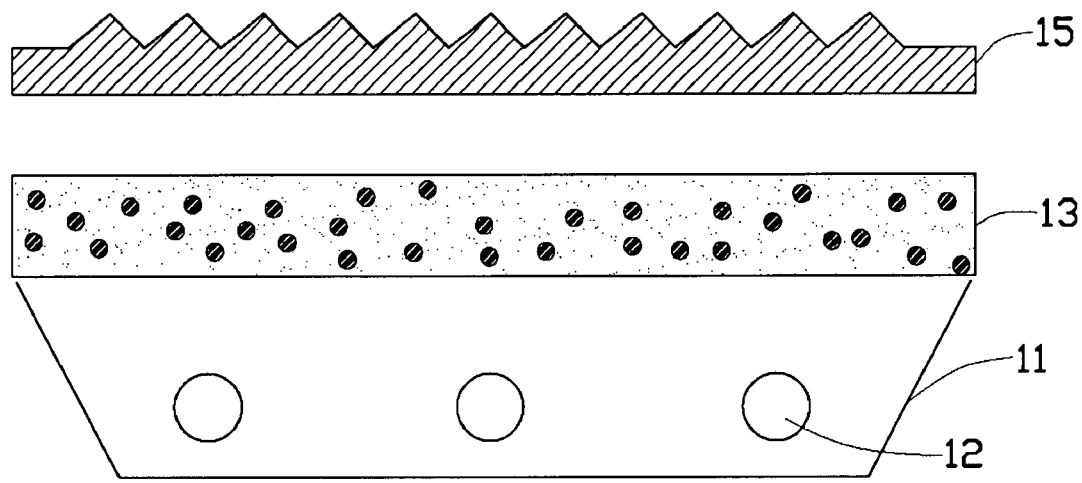
FIG. 10 is a side cross-sectional view of a conventional backlight module.

Referring to FIG. 9, an optical plate 60 according to a fifth embodiment of the present invention is shown. The optical plate 60 is similar in principle to the optical plate 20 of the first embodiment. However, the optical plate 60 includes a first transparent layer 61, a light diffusion layer 62, and a second transparent layer 63. A first common interface between the first transparent layer 61 and the light diffusion layer 62 is nonplanar. In the illustrated embodiment, the first common interface is defined by a plurality of protrusions of the light diffusion layer 62 interlocked in a corresponding plurality of recesses of the first transparent layer 61. Therefore, a binding strength between the first transparent layer 61 and the light diffusion layer 62 is increased. In one kind of further or alternative embodiment, a second common interface between the light diffusion layer 62 and the second transparent layer 63 can be a nonplanar interface.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical plate, comprising:
    a first transparent layer;
    a second transparent layer; and
    a light diffusion layer between the first transparent layer and the second transparent layer, the light diffusion layer including a transparent matrix resin and a plurality of diffusion particles dispersed in the transparent matrix resin, wherein the first transparent layer, the light diffusion layer, and the second transparent layer are integrally formed, with the first transparent layer in immediate contact with the light diffusion layer, and the second transparent layer in immediate contact with the light diffusion layer, the first transparent layer comprises a plurality of elongated V-shaped protrusions at an outer surface thereof that is distalmost from the second transparent layer, the second transparent layer comprises a plurality of micro-recesses at an outer surface thereof that is distalmost from the first transparent layer, each micro-recess is defined by at least three sidewalls interconnecting with each other, and a horizontal width of each sidewall of the micro-recess increases along a direction from an inmost end of the micro-recess to an opening of the micro-recess;
    wherein an interface between the light diffusion layer and the first transparent layer defines a plurality of micro-recesses having a same shape and arrangement as the micro-recesses at the outer surface of the second transparent layer.

2. The optical plate as claimed in claim 1, wherein each micro-recess is an inverted pyramid or a frustum of an inverted pyramid in shape.

3. The optical plate as claimed in claim 2, wherein a dihedral angle defined by two opposing sidewalls of the micro-recess is in the range from 60 degrees to 120 degrees.

4. The optical plate as claimed in claim 1, wherein a pitch between adjacent micro-recesses is in the range from about 0.025 millimeters to about 1 millimeter.

5. The optical plate as claimed in claim 1, wherein each of the elongated V-shaped protrusions is an elongated prism that extends along a direction parallel to one side surface of the optical plate.

6. The optical plate as claimed in claim 1, wherein a pitch between adjacent elongated V-shaped protrusions is in the range from about 0.025 millimeters to about 1.5 millimeters.

7. The optical plate as claimed in claim 1, wherein a vertex angle of each elongated V-shaped protrusion is in the range from about 60 degrees to about 120 degrees.

8. The optical plate as claimed in claim 1, wherein at least one of the at least one nonplanar interface comprises a plurality of protrusions of one of the layers interlocked in a corresponding plurality of recesses of the corresponding adjacent layer.

9. The optical plate as claimed in claim 1, wherein the transparent matrix resin of the transparent layer is made of material selected from the group consisting of polyacrylic acid, polycarbonate, polystyrene, polymethyl methacrylate, methylmethacrylate and styrene, and any combination thereof.

10. The optical plate as claimed in claim 1, wherein a material of the diffusion particles is selected from the group consisting of titanium dioxide, silicon dioxide, acrylic resin, and any combination thereof.

11. The optical plate as claimed in claim 1, wherein each of the first transparent layer and the second transparent layer is made of material selected from the group consisting of polyacrylic acid, polycarbonate, polystyrene, polymethyl methacrylate, methylmethacrylate and styrene, and any combination thereof.

12. The optical plate as claimed in claim 1, wherein a thickness of each of the light diffusion layer, the first transparent layer, and the second transparent layer is greater than or equal to 0.35 millimeters.

13. The optical plate as claimed in claim 12, wherein a combined thickness of the light diffusion layer, the first transparent layer and second transparent layer is in the range from about 1.05 millimeters to about 6 millimeters.

14. A direct type backlight module, comprising:
   a housing;
   a plurality of light sources disposed on or above a base of the housing; and
   an optical plate disposed above the light sources at top of the housing, the optical plate comprising:
   a first transparent layer;
   a second transparent layer; and
   a light diffusion layer between the first transparent layer and the second transparent layer, the light diffusion layer including a transparent matrix resin and a plurality of diffusion particles dispersed in the transparent matrix resin, wherein the first transparent layer, the light diffusion layer, and the second transparent layer are integrally formed, with the first transparent layer in immediate contact with the light diffusion layer, the second transparent layer in immediate contact with the light diffusion layer, and the first transparent layer comprises a plurality of elongated V-shaped protrusions at an outer surface thereof that is distalmost from the second transparent layer, the second transparent layer comprises a plurality of micro-recesses at an outer surface thereof that is distalmost from the first transparent layer, each micro-recess is defined by at least three sidewalls interconnecting with each other, and a horizontal width of each sidewall of the micro-recess increases along a direction from an inmost end of the micro-recess to an opening of the micro-recess;
   wherein an interface between the light diffusion layer and the first transparent layer defines a plurality of micro-recesses having a same shape and arrangement as the micro-recesses at the outer surface of the second transparent layer.

15. The direct type backlight module as claimed in claim 14, wherein a selected one of the first transparent layer and the second transparent layer of the optical plate is arranged to face the light sources.

* * * * *